United States Patent [19]
Hoffman et al.

[11] Patent Number: 5,263,893
[45] Date of Patent: Nov. 23, 1993

[54] AIR DISTRIBUTION HOUSING WITH INTEGRALLY FORMED INTERNAL BEARING PINS AND ITS METHOD OF MANUFACTURE

[75] Inventors: Donald E. Hoffman, Java Center; Peter J. Taylor, Lockport, both of N.Y.

[73] Assignee: General Motors Corporation, Detroit, Mich.

[21] Appl. No.: 916,454

[22] Filed: Jul. 20, 1992

[51] Int. Cl.$^5$ .............................................. B60H 1/26
[52] U.S. Cl. ...................... 454/69; 137/875; 251/367; 454/121
[58] Field of Search ................ 137/875; 165/42, 43; 251/367, 298, 305; 454/69, 121, 126, 139, 143, 156, 159, 160, 161

[56] References Cited

U.S. PATENT DOCUMENTS

| | | | |
|---|---|---|---|
| 452,644 | 5/1891 | Howell | 137/875 |
| 460,953 | 10/1891 | Crary | 137/875 |
| 616,252 | 12/1898 | Pennie | 251/367 X |
| 3,174,652 | 3/1965 | Villemure | 137/875 X |
| 4,200,258 | 4/1980 | Gliatas | 251/367 X |
| 4,402,486 | 9/1983 | Jacquet | 251/306 |
| 4,469,166 | 9/1984 | Aschoff et al. | 165/25 |
| 4,475,445 | 10/1984 | Dietzsch et al. | 454/159 |
| 4,552,181 | 11/1985 | Hawkins | 137/875 |
| 4,907,619 | 3/1990 | Paulson | 137/875 |

Primary Examiner—Harold Joyce
Attorney, Agent, or Firm—Patrick M. Griffin

[57] ABSTRACT

An air distribution housing in an automotive air conditioning system includes spaced wall portions forming an air passage for flow of conditioned air into the passenger compartment of a motor vehicle; each of the wall portions having pins directed internally of the wall portions without forming openings therethrough and including distal ends thereon inserted into a tubular end portion of the valve member for pivotally supporting the valve member within the air passage without penetrating through the spaced wall portions so as to prevent air leakage and resultant noise from the air distribution housing. A method of assembly of the air distribution housing includes the steps of providing two separate housing parts with integrally formed pins on the inner surfaces thereof; providing a valve door with a pivot tube on one end thereof; vertically locating one end of the tube on one of the pins; thereafter joining the housing parts to locate the other pin in the other end of the pivot tube.

4 Claims, 4 Drawing Sheets

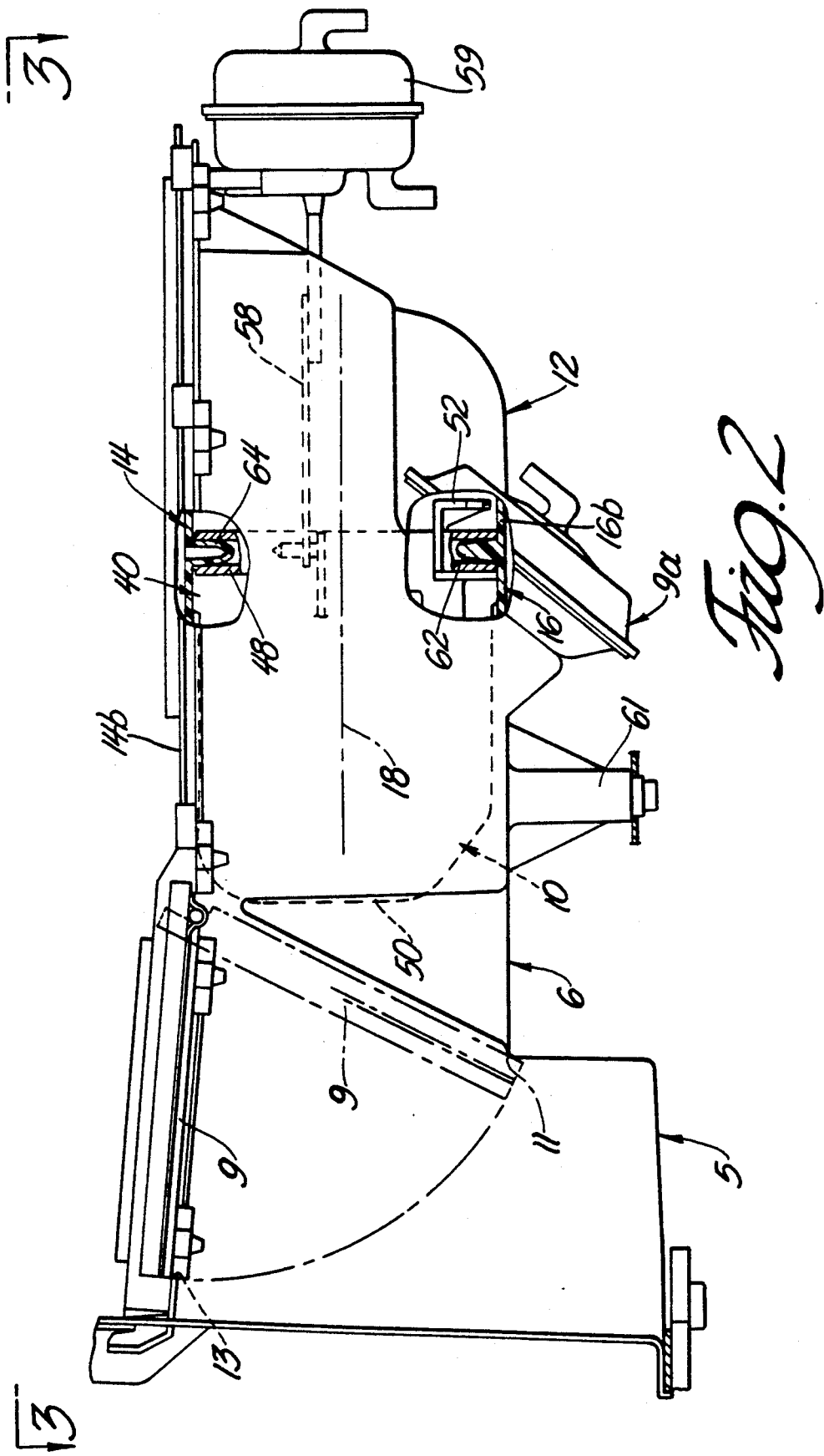

AIR DISTRIBUTION HOUSING WITH INTEGRALLY FORMED INTERNAL BEARING PINS AND ITS METHOD OF MANUFACTURE

FIELD OF THE INVENTION

This invention relates to automotive air conditioning systems and more particularly to heating, ventilating and air conditioning modules having an air distribution housing for directing the inlet air flow into the passenger compartment of a motor vehicle through defrost outlets or floor outlets and more particularly to a pivotal valve assembly within such housing for selectively controlling flow through first and second outlets and its method of manufacture.

DESCRIPTION OF THE RELATED ART

Various proposals are known for pivotally supporting a valve member within the flow passages of a housing for controlling flow of air conditioned air into various locations in a passenger compartment.

One example is shown in U.S. Pat. No. 4,402,486 wherein a valve member has a flat valve plate with tubular end pieces thereon forming pins on the flat valve plate for pivotally supporting the valve plate within spaced side walls of piping for the air flow. One of the side walls has a cylindrical valve bearing boss that penetrates through the walls of the piping. The clearance provided between the tubular end piece of the valve member and the cylindrical boss represents a path for leakage of air from the valve assembly. Such air leakage can result in objectionable hissing noise.

Another example of a pivotally supported valve member is shown in U.S. Pat. No. 4,469,166 wherein a valve member is supported for movement between spaced side walls for controlling flow through first and second passages into the vehicle interior. The valve member is actuated by an output shaft from a gear set connected to a temperature regulator. The output shaft is directed through a bearing opening in the side wall of the valve assembly and the clearance between the output shaft and the side wall likewise defines a path for undesirable air leakage.

A further disadvantage of the aforesaid valve members is that the bearing supports for the valve member protrude exteriorly of the valve housing making it difficult to mate other parts. Such parts must be configured to fit around the valve bearing components thus adding to the cost of manufacture and assembly of the component parts an air conditioning system.

SUMMARY OF THE INVENTION

An object of the present invention is to provide an easily assembled, low cost valve assembly for an automobile air conditioning system wherein the valve assembly eliminates air leakage from the valve housing and further provides for flat external surfaces on the walls of the valve assembly for easier assembly of mating parts.

A further object is to provide an improved method of manufacture of such valve assemblies including the steps of providing two separate housing parts with integrally formed pins on the inner surfaces thereof; providing a valve door with a pivot tube on one end thereof; vertically locating one end of the tube on one of the pins; thereafter joining the housing parts to locate the other pin in the other end of the pivot tube.

One feature of the present invention is the provision of a valve assembly having a valve member that has a flat portion for mounting resilient sealing flaps and that further has a tubular end portion with opposite open ends located internally of the spaced side walls of a valve housing, the side walls forming flat external surfaces for mating parts and having integral pins thereon only extending internally of the valve housing for pivotally connecting in opposite open ends of the tubular end portion for supporting the valve member while sealing the housing.

Another feature of the present invention is the provision of a valve assembly having a plastic valve member with a flat portion for mounting resilient sealing flaps and further having a tubular end portion with opposite open ends located internally of the spaced side walls of a valve housing, the side walls forming flat external surfaces for mating parts and having integral pins integrally formed therein extending internally of the valve housing into operative engagement with the tubular end portion for pivotally supporting the plastic valve member while sealing the side walls.

Still another feature of the present invention is to provide an automobile air conditioning system air flow distributor box having a first passage with spaced walls for directing conditioned air with respect to second and third passages and a pivotable valve including a flap valve on a valve plate for selectively controlling air flow through the second and third passages characterized by: the valve member having a tubular end portion having a width corresponding to the width of the first passage; and bearing pins formed in spaced parallel walls of the first passage extending internally of the first passage and into the tubular end portion for supporting the valve member for pivotal movement with respect to first and second valve seats for selectively controlling air flow through the second and third passages.

Yet another feature of the present invention is to provide an automobile air conditioning system flow distributor having an inlet passage having spaced walls for directing conditioned air with respect to first and second outlets and a pivotable valve located downstream of the inlet passage including a flap valve and a valve plate for selectively controlling air flow through the first and second outlets characterized by: the valve member having a generally rectangular plate portion and a tubular end portion connected to the plate portion; the tubular end portion having a width corresponding to the width of the inlet passage; and bearing pins formed in spaced parallel walls of the inlet passage extending internally of the inlet passage and into the tubular end portion for supporting the generally rectangular plate portion for pivotal movement of the flap valve into engagement with first and second valve seats for selectively controlling air flow throughout the first and second outlets.

Yet another feature of the present invention is to prevent air leakage from the valve assemblies of the preceding objects and features by forming the bearing pins integrally of the spaced walls.

Still another feature of the present invention is to provide a method to simplify assembly of the valve assembly including the steps of providing first and second housing members forming the spaced walls of the inlet passage; separating the first and second housing members at a split line; installing a tubular end of the valve member on a pin on one of the housing members; joining the housing members while inserting a pin on the other housing part into the tubular end portion for supporting the valve member for pivotal movement with respect to first and second valve seats while sealing the housing members at the split line therebetween.

Still another feature is to provide an automobile air conditioning system flow distributor having a first, second and third passages formed within a housing having spaced walls for directing conditioned air with respect to the various passages and a pivotable valve including a pair of valve seats and a valve member for selectively controlling air flow through the respective passages characterized by: the valve member having a tubular end portion having a width corresponding to the width of the air passage; and bearing pins integrally formed in spaced parallel walls of the first passages extending internally thereof; the tubular end portion having oppositely located end openings therein and the bearing pins located within the oppositely located end openings for supporting the valve member for pivotal movement with respect to the first and second valve seats for selectively controlling air flow throughout the respective passages; at least one of the bearing pins having an internal opening accessible from exteriorly of one of the spaced walls for supporting the one of the spaced walls for installation of one of the bearing pins into the tubular end portion.

Still another feature of the present invention is to provide an automobile air conditioning system flow distributor having plural passages formed by spaced walls for directing conditioned air with respect to the plural passages and a pivotable valve including a pair of valve seats and a valve member for selectively controlling air flow through the respective passages characterized by: the valve member having a tubular end portion having a width corresponding to the spacing of the spaced walls and first and second housing members forming the spaced walls the first and second housing members joined at a split line and separable along said split line for installation of the valve member therebetween; each of the housing members having a flat exterior surface and an integrally formed bearing pin extending internally of a flow passage and into the tubular end portion for supporting the valve member for pivotal movement with respect to the first and second valve seats for selectively controlling air flow throughout the respective passages; at least one of the bearing pins having an internal opening accessible from exteriorly of one of the first and second housing members for supporting one of the first and second housing members for installation of the at least one of the bearing pins into the tubular end portion.

These and other objects, features and advantages of the present invention will be more apparent when taken in conjunction with the following detailed description of the invention along with reference to the accompanying drawings wherein:

BRIEF DESCRIPTION OF THE DRAWINGS

FIG. 2 is an enlarged top elevational view of the air distribution box in FIG. 1 including vacuum actuators for controlling valves therein;

DETAILED DESCRIPTION OF A PREFERRED EMBODIMENT

Figure 1:
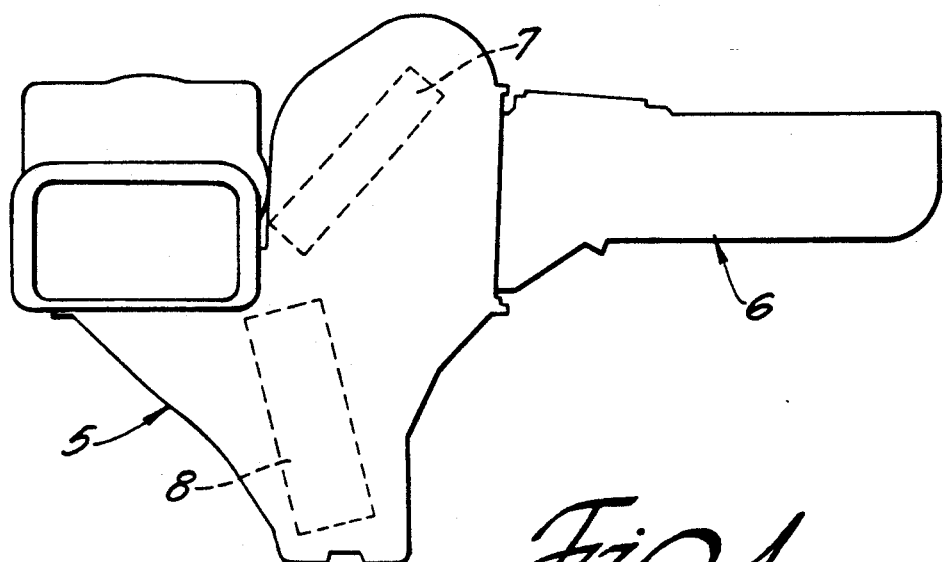
FIG. 1 is an elevational view of a heating, ventilating and air conditioning module with an air distribution box including the present invention.
Figure 4:
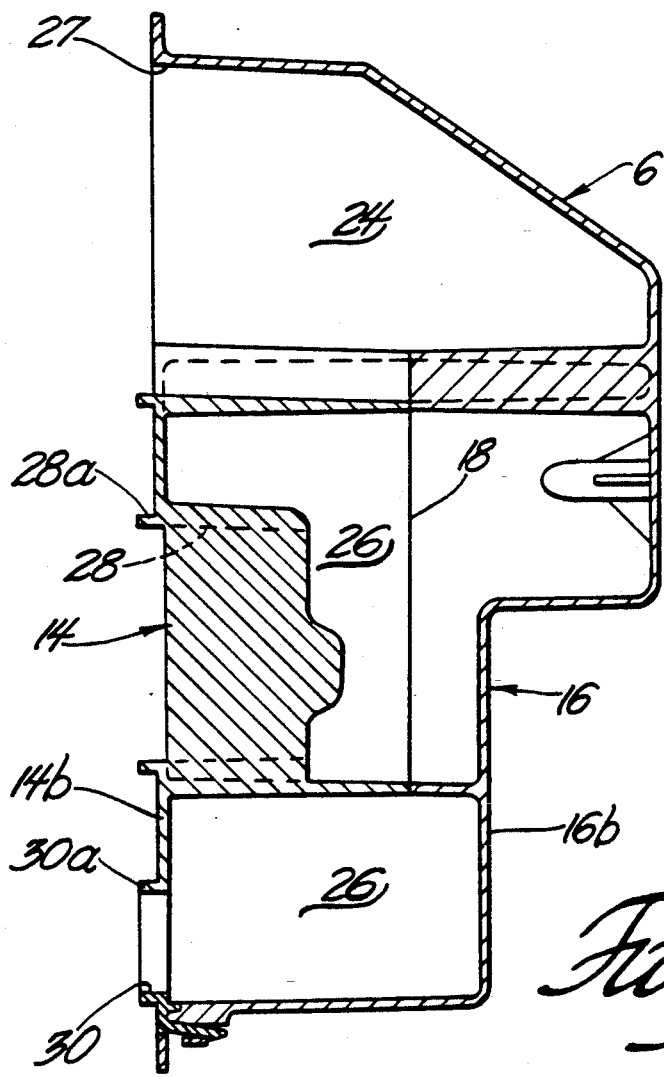
FIG. 4 is an enlarged sectional view taken along the line 4—4 of FIG. 3 looking in the direction of the arrows.

Referring now to FIG. 1, a heating, ventilating and air conditioning module 5 is shown for use in an automobile air conditioning system. The module 5 includes an air distribution box 6 controlling air flow from a heater core 7 and an evaporator 8. The air distribution box 6 has a selector mode door 9 operated by vacuum controller 9a either to direct the air in the air distribution box 6 through opening 11 or to connect the module 5 to instrument panel outlets through opening 13 during cooling modes.

The air distribution box 6 includes a valve assembly 10 constructed in accordance with the present invention to provide flat exterior surfaces on the air distribution box 6 as well as a valve bearing structure that is located wholly within the air distribution box 6 so as to prevent air leakage through the walls thereof.

For purposes of the present invention it is only necessary to describe a downstream portion of the air distribution box including a housing 12 having first and second separable housing parts 14, 16 joined together at a split line joint 18 for forming a flow system 20. The flow system 20 has first, second and third passages 22, 24, 26 therein. The flow passage 22 in this embodiment of the invention is formed downstream of a door 9. The flow passage 22 receives conditioned air from the module 5 and the valve assembly 10 and provides a path for directing air flow either through passage 24 that connects to a heater outlet 27 that connects to floor outlets (not shown) in the passenger compartment or through passage 26 to a defrost outlet 28 connected through defrost openings in the instrument panel 30 of the vehicle (not shown) and to a defrost outlet 30 that connects to a distribution system (not shown) for directing heated defrost air against the side windows of the vehicle.

The above described air flow passages 22, 24 and 26 are merely representative of one flow system in which the valve assembly 10 of the present invention has application. The valve assembly 10 is equally suited for use in controlling air flow through parallel cold and hot air ducts or for controlling air flow through an evaporator core within the module 8 or for controlling pivotable movement of temperature doors in a heating, ventilating and air conditioning module.

In the present invention the valve assembly 10 includes a pair of valve seats 32, 34 defined by a pair of spaced wall segments 36, 38 on the separable housing parts 14, 16 to form air flow ports 41, 43 between the passages 22, 24 and 26.

Figure 5:
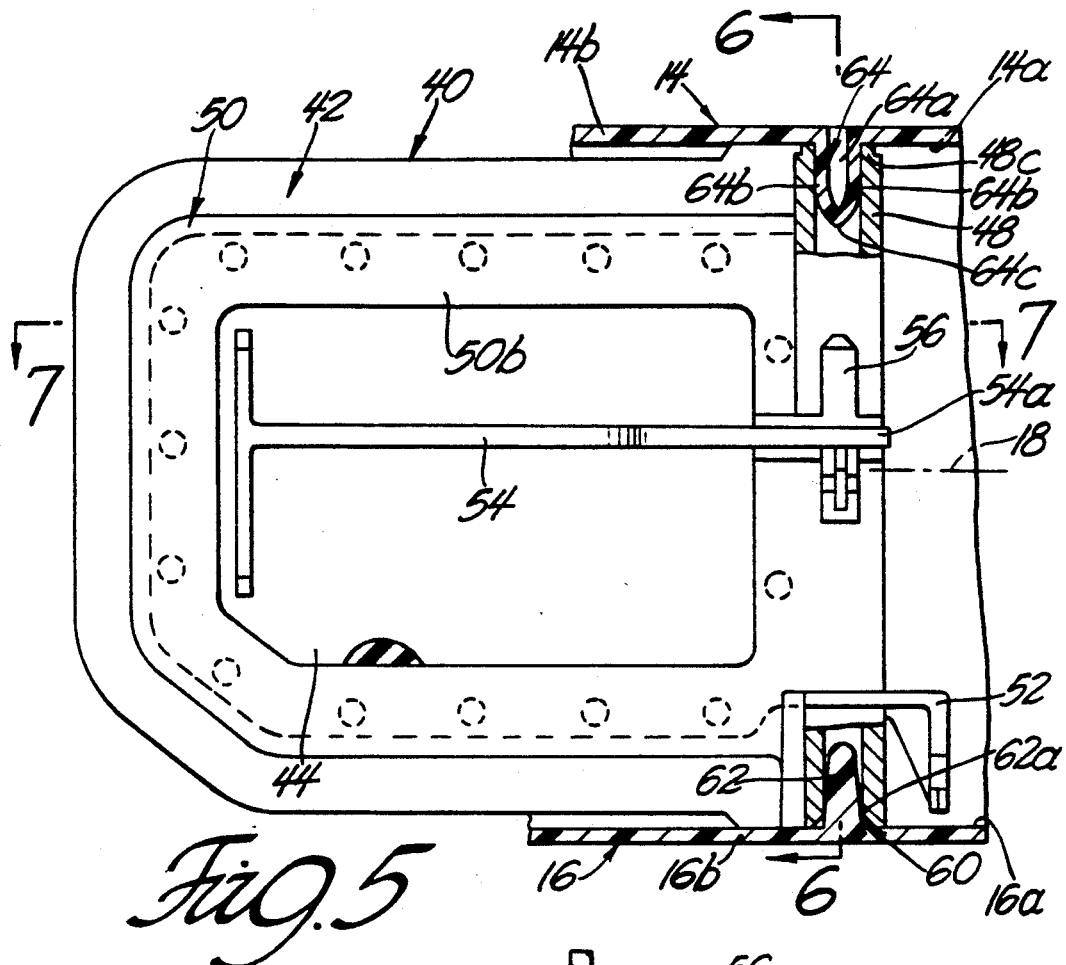
FIG. 5 is a sectional view taken along the line 5—5 of FIG. 3 looking in the direction of the arrows.
Figure 6:
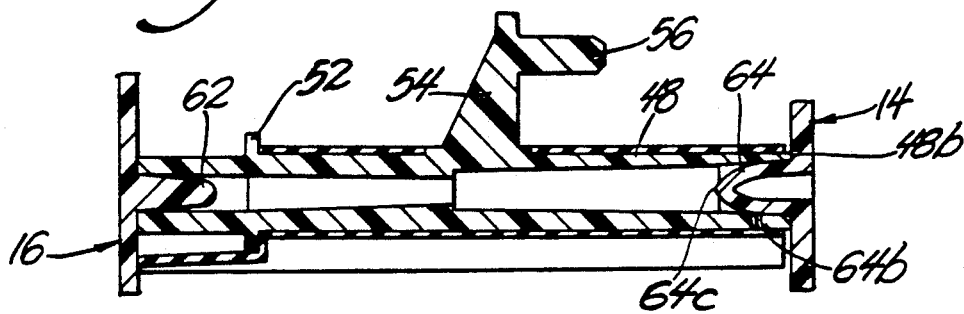
FIG. 6 is a sectional view taken along the line 6—6 of FIG. 5 looking in the direction of the arrows.
Figure 7:
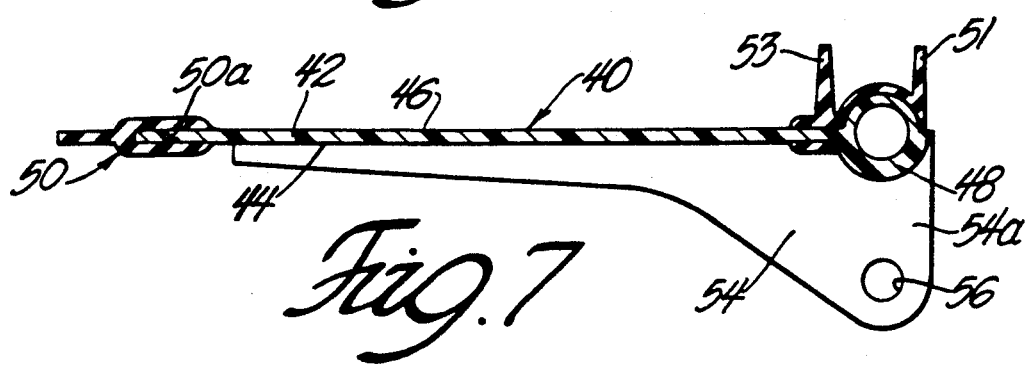
FIG. 7 is a sectional view taken along the line 7—7 of FIG. 5 looking in the direction of the arrows.

The valve assembly 10 is further characterized by a molded plastic valve member 40 best shown in FIGS. 5-7. The valve member 40 has a flat portion 42 thereon with opposite peripheral surfaces 44, 46 that carry a seal flap 50 positioned in sealing engagement with the valve seats 32, 34 for either closing or opening the respective air flow ports 41, 43. At the opposite end of the flat portion, a pair of dependent seal flaps 51, 53 are provided to seal against wall surfaces 55,57 to prevent leakage at the pivoted end of the valve assembly 10.

In accordance with one aspect of the present invention, the valve member 40 is a molded plastic that includes a tubular portion 48 integrally formed with the flat portion 42 at one end thereof. The rubber seal flap 50 has a rectangular groove 50a that fits over the periphery of the flat portion as shown in FIG. 7. The flap 50 covers the tubular portion 48 and is interlocked thereto by an annular flange 52 thereon.

Figure 3:
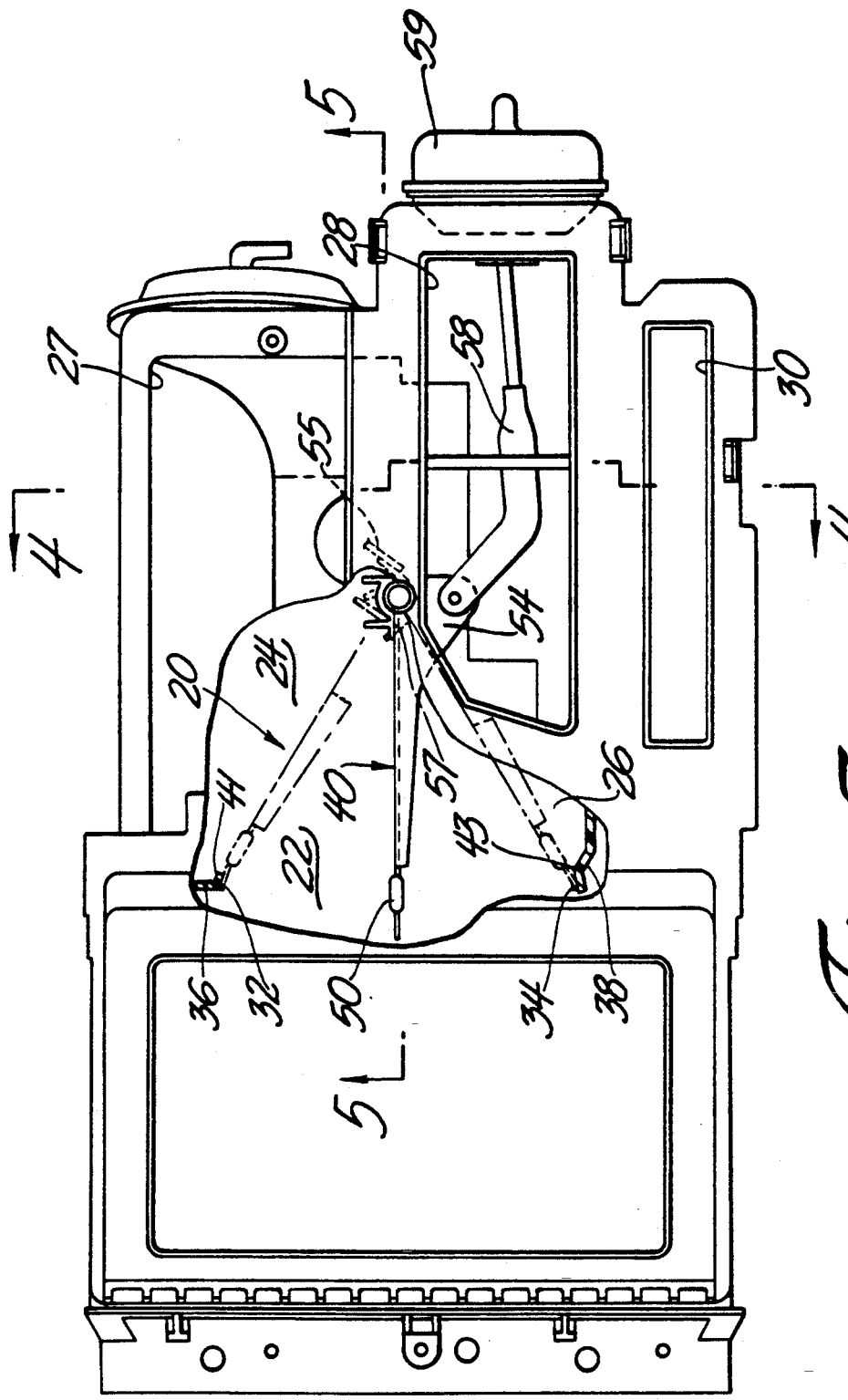
FIG. 3 is a side elevational view looking in the direction of arrows 3—3 in FIG. 2.

The flat portion 42 also has a center rib 54 that increases in depth along the surface 44 to a lever portion 54a thereon offset from the axis of the tubular portion 48. The lever portion 54a has a pin 56 integrally formed thereon extending in spaced parallelism with the axis of the tubular portion 48 to form a crank arm for connection to an offset lever arm 58 that is connected to a vacuum actuator 59 on the exterior of the air distributor box 6 as best seen in FIG. 3.

In accordance with another aspect of the present invention, the valve member 40 is supported by a bearing system 60 that is located wholly within the air distributor box 6 so as to prevent air leakage therefrom. More particularly, the bearing system 60 includes a first bearing pin 62 that is integrally formed in the housing part 16 to define a first locator for assembling the valve member 40 within the air distributor box 6 when the housing parts 14, 16 are separated prior to final assembly. The first bearing pin 62 is a solid pin integrally molded within the housing portion 16 to define an upstanding guide for locating a first open end 48b of the tubular portion on the valve member 40. Thereafter the housing portion 14 is fit in place by locating a second bearing pin 64 thereon in a second open end 48c of the partially assembled valve member 40 as it sits upright on the housing part 16 in guided relationship on the pin 62.

The second bearing pin 64 has a peripheral end 64a integrally joined to the inner surface 14a to seal the wall portion 14 against air leakage therefrom. The second bearing pin 64 has a tubular portion 64b that ends at a nose portion 64c that forms a pilot for guiding the wall of housing part 14 with respect to the wall of housing part 16 when the two parts are joined. The aforedescribed construction enables separate wall portions of a module to be joined without the need to extend fixturing pins through holes in the housing portions to align bearings in the pivoted end of a flap or door type valve member.

In the past it has been necessary to separately seal such fixturing holes adding to the cost of assembly. Bearing pins 62,64 each include a peripheral surface 62a,64a at its base. The peripheral surface 62a,64a joins to an inner surface 14a,16a of wall 14,16 to form an air leakage sealed joint therebetween Thus, the present invention eliminates the cost of separate seals but also eliminates the cost of such fixturing pins since the bearing pins 62, 64 serve as the fixtures for assembling the valve member within the module.

The bearing system 60 is further characterized by providing a bearing support wholly within the interior of the module so that the outer surfaces 14b and 16b of the wall parts 14, 16 are flat surfaces that are easily mated with other parts of a heating, air conditioning and ventilating module such as at peripheral connection lips 28a,30a around the outlets 28,30 and a mounting post 61 on wall 16.

By virtue of the above described bearing system 60, holes are eliminated in the wall portions of the air distribution box 6 at the bearing pins and the internal location of the bearing pins 62, 64 of the present invention locates the clearance space between the bearing pins and the valve pivot portion at a location such that there will no longer be air leakage with its attendant noise problem during operation of the module 8. Additionally, the pin 62 on the housing part 16 eliminates the need for a retractable fixture pin while defining an internal bearing for the valve member 40. The pin 64 on the other housing part half has a conical point 64c to allow for ease of assembly while providing the opposite bearing for the valve member 40.

The housing parts 14, 16 and valve assembly 40 are assembled by an improved method in which housing part 16 is arranged with pin 62 in the vertical; then the valve 40 is positioned on the housing part 16 such that the open end 48b of tubular end 48 will fit over pin 62. Then the housing part 14 is assembled to housing part 16 at the joint 18 to locate pin 64 in the open end 48c of the tubular end 48.

While the foregoing is a complete description of a preferred embodiment of the present invention, it should be understood that various changes and modifications may be made without departing from the spirit and broad scope of the present invention. The invention is limited only by the scope of the following claims.

The embodiments of the invention in which an exclusive property or privilege is claimed are defined as follows:

1. An automobile air conditioning system flow distributor having a first passage having spaced walls for directing conditioned air with respect to second and third passages and a pivotable valve located downstream of the first passage including a pair of valve seats and a valve member for selectively controlling air flow through the second and third passages characterized by:
   a valve member having a tubular end portion having a width corresponding to the width of the first passage; and
   bearing pins integrally formed in the walls of the first passage extending internally of the first passage;
   said tubular end portion having oppositely located end openings therein and said bearing pins located within said oppositely located end openings for supporting said valve member for pivotal movement with respect to the first and second valve seats for selectively controlling air flow throughout the second and third passages;
   at least one of said bearing pins having an internal opening accessible from exteriorly of one of the spaced walls for supporting the one of said spaced walls for installation of said one of said bearing pins into said tubular end portion.

2. An automobile air conditioning system flow distributor having a first passage having spaced walls for directing conditioned air with respect to second and third passages and a pivotable valve located downstream of the first passage including a pair of valve seats and a valve member for selectively controlling air flow through the second and third passages characterized by:
   a valve member having a flat portion and tubular end portion having a width corresponding to the width of the first passage; and
   first and second housing members forming the spaced walls of the first passage; said first and second housing members joined at a split joint and separable along said split joint for installation of said valve member therebetween; each of said housing members having an integrally formed bearing pin therein formed in the walls of the inlet passage extending internally of the first passage and into said tubular end portion for supporting said valve member for pivotal movement with respect to the first and second valve seats for selectively controlling air flow throughout the second and third passages;

at least one of said bearing pins having an internal opening accessible from exteriorly of one of said first and second housing members for supporting the one of said first and second housing members for installation of said at least one of said bearing pins into said tubular end portion;

a first flap seal on one end of said valve member extending substantially in the plane of said flat portion and second and third flap seals spaced apart on the other end of said valve member and extending substantially perpendicular to said flat portion.

3. An automobile air conditioning system flow distributor having a first passage having spaced walls for directing conditioned air with respect to second and third passages and a pivotable valve located downstream of the first passage including a pair of valve seats and a valve member for selectively controlling air flow through the second and third passages characterized by:

a valve member having a flat portion and tubular end portion having a width corresponding to the width of the first passage; and bearing pins integrally formed in the walls of the first passage extending internally of the first passage;

said tubular end portion having oppositely located end openings therein and said bearing pins located within said oppositely located end openings for supporting said valve member for pivotal movement with respect to the first and second valve seats for selectively controlling air flow throughout the second and third passages;

at least one of said bearing pins having an internal opening accessible from exteriorly of one of the spaced walls for supporting the one of said spaced walls for installation of said one of said bearing pins into said tubular end portion.

4. An automobile air conditioning system flow distributor having a first passage having spaced walls for directing conditioned air with respect to second and third passages and a pivotable valve located downstream of the first passage including a pair of valve seats and a valve member for selectively controlling air flow through the second and third passages characterized by:

a valve member having a flat portion and tubular end portion having a width corresponding to the width of the first passage; and first and second housing members forming the spaced walls of the first passage; said first and second housing members joined at a split joint and separable along said split joint for installation of said valve member therebetween; each of said housing members having an integrally formed bearing pin therein formed in the walls of the inlet passage extending internally of the first passage and into said tubular end portion for supporting said valve member for pivotal movement with respect to the first and second valve seats for selectively controlling air flow throughout the second and third passages;

at least one of said bearing pins having an internal opening accessible from exteriorly of one of said first and second housing members for supporting the one of said first and second housing members for installation of said at least one of said bearing pins into said tubular end portion;

a first flap seal on one end of said valve member extending substantially in the plane of said flat portion and second and third flap seals spaced apart on the other end of said valve member and extending substantially perpendicular to said flat portion.

* * * * *